SWITCHBOARD MESSAGE TABS AND HOLDERS THEREFOR

Filed Nov. 6, 1953

INVENTORS.
DONALD B. LYTLE &
VIRGINIA L. PAYNE
BY
Campbell, Brumbaugh, Free & Graves
Their ATTORNEYS United States Patent Office 2,818,662

Patented Jan. 7, 1958

2,818,662

SWITCHBOARD MESSAGE TABS AND HOLDERS THEREFOR

Virginia L. Payne, Chicago, and Donald B. Lytle, Wilmette, Ill.

Application November 6, 1953, Serial No. 390,605

2 Claims. (Cl. 35—66)

This invention relates to devices for recording information and more particularly to a pressure sensitive information recording device having a plurality of separate panels or sections whereon various messages and data can be noted for future reference, and after serving its purpose, the notation on a particular panel may be quickly cleared and erased so that further information can be recorded thereon.

The present invention may have various applications, but it is particularly suited for application to telephone switchboards for holding information of a temporary nature relative to the calls being held on the various keys of the switchboard.

At the present time, telephone switchboard operators frequently rely on their memories for retaining information regarding the calls being held on each key. Operators relying on their memories run the risk of making mistakes causing embarrassment and delay to the parties involved. Other operators employ long strips of cardboard, manila or plain paper arranged in close proximity to the keys of the switchboard for jotting down this information with a pencil. But this system is not practical on busy boards because time does not permit proper erasure of the data and, hence, the strip requires replacement many times during the course of the day.

The present invention is a handy and convenient accessory for a telephone switchboard whereby a small pressure-sensitive panel or board, of a type known as a "magic slate," is closely associated with each key of the switchboard, and upon which the telephone operator may record notations regarding the disposition of each key and the calls being held on the line merely by writing upon the face of the panel with any pointed instrument. These notations serve as visual reminders for as long as necessary, and when they have served their purpose, the information recorded thereon may be instantly released merely by raising the sheet upon which the message had been recorded. As soon as the information has been wiped out in this manner, the magic slate panel is ready to receive additional notations.

The individual magic slate panels are incorporated in a single elongated pad, the panels being located side by side across the pad, and the pad is adapted to be inserted in a special holder designed for attachment to the telephone switchboard. The holder is adapted to fit over the two keys at the opposite ends of the board and it is further provided with a clamp along its upper edge for receiving the magic slate pad.

As explained above, the pad is divided into a plurality of panels or sections, one section being allotted to each key of the switchboard, and when the pad is properly inserted in the holder and the latter properly applied to the switchboard, each panel of the magic slate pad would be located directly beneath the key with which it is associated. When a call comes in which is to be held for a particular person or for a special reason, the operator can conveniently make the proper notation on the panel or section associated with the key, and when a call has been received and the key thrown open again, the information on the panel or section associated with that key can be quickly erased merely by lifting the upper sheets of the magic slate in a manner to be described.

For a complete understanding of the present invention reference may be had to the detailed description which follows, and to the accompanying drawings in which.

Figure 1:
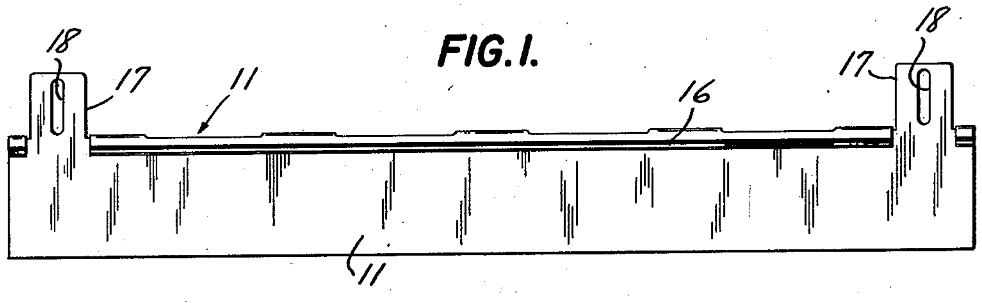
Fig. 1 is a representation of the holder.

Referring to the drawing, the present invention comprises generally a "magic slate" pad 10 (see Fig. 2) and a holder 11 (see Fig. 1) therefor adapted to be attached to the top of a telephone switchboard.

Conventionally and in this application the term "magic slate" denotes a pad for recording information comprising a top sheet of clear transparent acetate, a middle sheet of opaque paper, and a stiff wax-coated backing made of heavy cardboard or other suitable material. Ordinarily, the intermediate opaque sheet is white in color, such as a white acetate sheet or wax paper, and the wax coating on the backing is black in color. The purpose of the above material is to allow writing of the information on the top surface of the transparent acetate with either a pencil or some pointed implement. The pressure of the pencil or the pointed implement causes the white opaque sheet to adhere to the black wax-coated backing, so that the path in which the pencil or pointed implement is moved is sharply and visually recorded through the transparent acetate. The notation may be quickly and easily removed merely by lifting the two top sheets, namely the acetate and the opaque sheets to separate the opaque sheet from the wax-coated backing.

Figures 2, 3, 4:
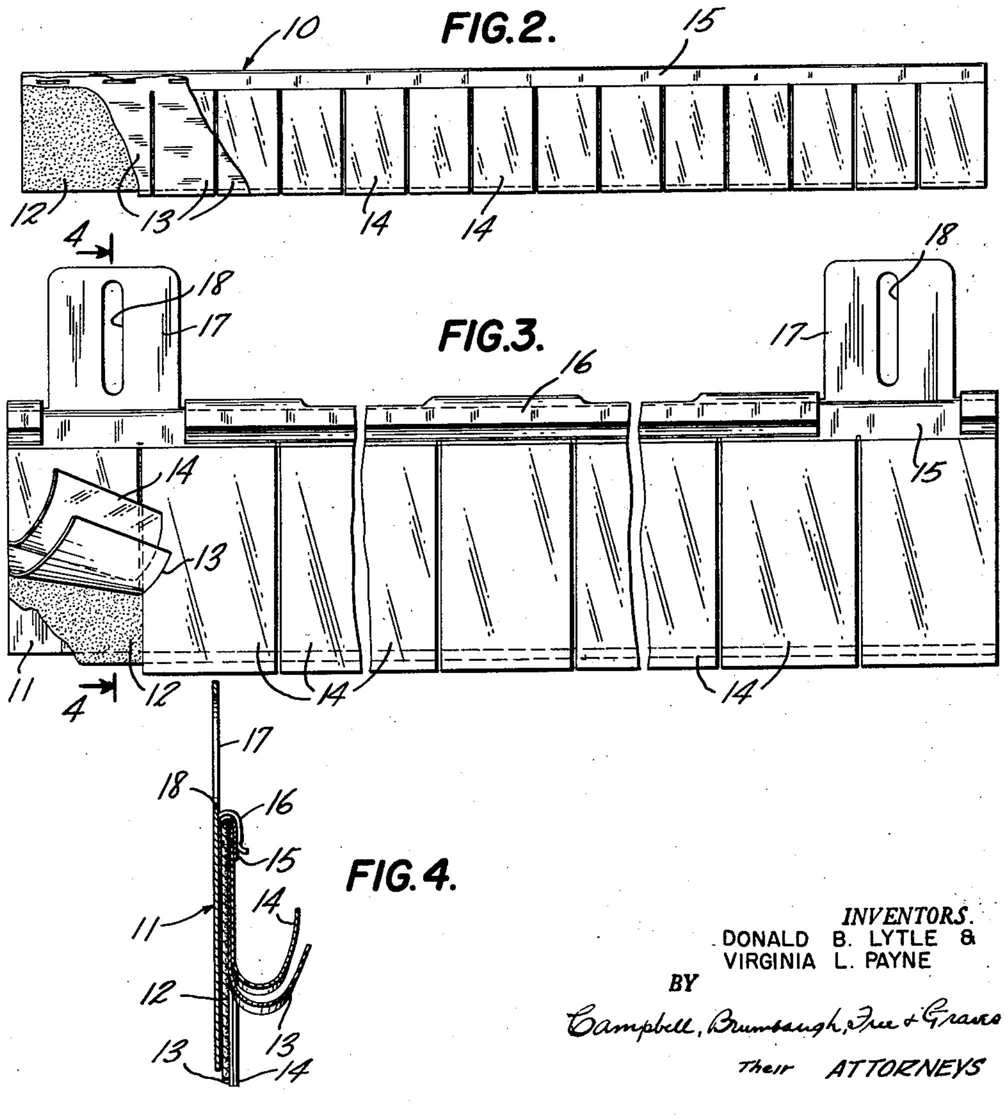
Fig. 2 is a representation of the magic slate pad.
Fig. 3 is an enlarged view of the pad inserted within the holder.
Fig. 4 is a cross-section view taken along the line 4—4 of Fig. 3, looking in the direction of the arrows.

The magic slate of the present invention is unique in that it comprises a long, thin pad divided into a plurality of separate writing panels or sections. As best shown in Fig. 2, the stiff backing 12 is preferably a heavy cardboard, coated with a black or dark colored wax. A plurality of strips of opaque paper 13 preferably white in color, are arranged side by side in parallel abutting relationship directly above the wax-coated surface of the backing 12, and a plurality of strips 14 of clear transparent acetate overlie the opaque strips, the side edges of the strips 14 being coincident with the side edges of the strips 13.

Each of the strips 13, 14 may be entirely separate, or they may be formed, as indicated in Fig. 2, from a single long, thin sheet by cutting slits in the sheet from the bottom toward the top. The width of each strip will be about one and one-thirty second inches ( $1\frac{1}{32}''$), or the space allotted to each key of the switchboard. The overlying strips or sheets 13, 14 may be attached at their upper ends to the upper end of the front face of the backing 12 by a glue adhesive or by staples and the upper edge of the entire pad 10 may be covered by a binding 15.

It is evident that notations may be made in each strip or panel by pressing a pointed implement or pencil against the top surface of the thin acetate sheet 14, so that the pressure of the implement causes the opaque sheet to closely adhere to the wax coating of the backing only along the lines traced by the pointed instrument or pencil. If the color contrast between the wax coating and the opaque sheet is great enough, the lines traced by the implement or pencil will be clearly visible through the transparent acetate sheet. For example, if the wax coating of the backing is black and the opaque sheet white, the notations made on the magic slate pad will appear black in color against a white background.

The information may be removed from each panel or section individually by lifting the two upper strips or sheets, namely, the opaque sheet 13 and the upper transparent sheet 14, thereby separating the opaque sheet from the wax coating of the backing. As shown in the drawings, the lower ends of the sheets 13, 14 may project slightly below the lower edge of the backing 12 so that they may be more easily lifted to erase the information. When the information is thus removed, the particular panel or section is ready to have another notation or message impressed upon it.

The holder 11 for the above-described pad 10, as shown in Fig. 1, is made of a long narrow strip of flat metal or plastic stock having a curled, resiliently flexible lip 16 along its upper edge. This lip receives the upper edge of the pad 10 and has a clamping effect thereon. Each end of the holder is provided with an upwardly projecting tab 17 having a slot 18 therein to receive the end keys of the switchboard. The holder has been designed so that these two end slots fit over the two keys at the opposite ends of the switchboard, and it is by this means that the present invention is applied to the switchboard. Obviously, the holder may be more permanently anchored to the switchboard by screws, clips, or other suitable attachments. However, such permanent fasteners are not necessary for the proper functioning of the present invention.

It is evident that when the holder is thus mounted to the switchboard and the magic slate pad inserted under the lip clamp of the holder, each panel or strip of the pad will be directly beneath the key of the switchboard with which it is associated, so that notations or memoranda may be marked on the panel, and it will be clearly evident that the notations refer to the corresponding key.

The present invention has been shown and described in but a single preferred form and by way of example, and, of course, many variations and modifications may be made therein and in its mode of application which are within the spirit of the invention. It is to be understood, therefore, that the invention is not to be limited to any specific form or embodiment, except in so far as such limitations are expressly set forth in the claims.

We claim:

1. An information recording device for telephone switchboards comprising a short, wide magic slate pad divided into a plurality of separate information recording panels spaced side by side across the width of the pad from which the information recorded thereon can be separately erased, the spacing between adjacent information recording panels corresponding to the spacing between the keys or plugs of the switchboard, and a rigid holder therefor made of a resilient material, the pad comprising a wide, stiff backing strip, a plurality of flexible opaque flaps arranged side by side across the width of the stiff backing, the back surface of the opaque flap overlying the surface of the backing and adhering thereto upon the application of pressure by a stylus, a plurality of flexible transparent flaps, one overlying each of the opaque flaps, means binding the opaque and transparent flaps at their upper ends to the upper portion of the stiff backing, the opaque and transparent flaps being defined by substantially vertical conterminous edges, and the holder comprising a flat plate of approximately the same size as the pad, at least two tabs formed integrally with and extending outwardly from the upper edge of the plate, said tabs having slots therein so that the holder may be anchored to the switchboard, and a downturned clip formed integrally with the upper edge of the plate and extending along the upper edge of the plate continuously between the tabs for clamping the upper edge of the pad to the holder.

2. An information recording device comprising a short, wide magic slate pad divided into a plurality of separate information recording panels spaced side by side across the width of the pad from which the information recorded thereon can be separately erased, and a rigid holder therefor made of a resilient material, the pad comprising a wide, stiff backing strip, a plurality of flexible opaque flaps arranged side by side across the width of the stiff backing, the back surface of the opaque flap overlying the surface of the backing and adhering thereto upon the application of pressure by a stylus, a plurality of flexible transparent flaps, one overlying each of the opaque flaps, means binding the opaque and transparent flaps at their upper ends to the upper portion of the stiff backing, the opaque and transparent flaps being defined by substantially vertical conterminous edges, and the holder comprising a flat plate of approximately the same size as the pad, at least two tabs formed integrally with and extending outwardly from the upper edge of the plate, said tabs having slots therein so that the holder may be anchored to a support, and a downturned clip formed integrally with the upper edge of the plate and extending along the upper edge of the plate between the tabs for clamping the upper edge of the pad to the holder.

References Cited in the file of this patent

UNITED STATES PATENTS

| | | |
|---|---|---|
| 748,005 | Powers | Dec. 29, 1903 |
| 1,462,683 | Bush | July 24, 1923 |
| 1,482,569 | Oswald | Feb. 5, 1924 |
| 1,545,606 | Ryder | July 14, 1925 |
| 1,729,916 | Vernon | Oct. 1, 1929 |
| 1,757,287 | Bildstein | May 6, 1930 |
| 1,902,641 | Haveles | Mar. 21, 1933 |
| 2,074,855 | Paasche | Mar. 28, 1937 |
| 2,198,347 | Mitnitzky | Apr. 23, 1940 |
| 2,226,454 | Walters | Dec. 24, 1940 |
| 2,272,321 | Haveles | Feb. 10, 1942 |
| 2,663,093 | Lipkin | Dec. 22, 1953 |
| 2,676,035 | Frallic | Apr. 20, 1954 |
| 2,717,165 | Shapiro | Sept. 6, 1955 |

FOREIGN PATENTS

| | | |
|---|---|---|
| 414,303 | Germany | June 3, 1925 |